(12) United States Patent
Hoffman et al.

(10) Patent No.: US 6,372,022 B1
(45) Date of Patent: Apr. 16, 2002

(54) IONIC PURIFIER

(75) Inventors: Joe G. Hoffman, Dallas, TX (US); Wallace I. Yuan, Irvine, CA (US)

(73) Assignee: Air Liquide America Corporation, Houston, TX (US)

( * ) Notice: Subject to any disclaimer, the term of this patent is extended or adjusted under 35 U.S.C. 154(b) by 0 days.

(21) Appl. No.: 09/635,927

(22) Filed: Aug. 10, 2000

(51) Int. Cl.[7] .............................................. B01D 47/06
(52) U.S. Cl. ............................. 95/211; 95/227; 95/228; 95/233; 96/290
(58) Field of Search ......................... 95/210, 211, 149, 95/227, 228, 229, 232, 236, 233, 230; 96/290

(56) References Cited

U.S. PATENT DOCUMENTS

| | | | |
|---|---|---|---|
| 993,868 A | * | 5/1911 | Pauling |
| 2,545,314 A | * | 3/1951 | Seebold |
| 3,122,594 A | * | 2/1964 | Kielback |
| 3,445,182 A | * | 5/1969 | Tomany |
| 3,936,281 A | * | 2/1976 | Kurmeier |
| 5,242,468 A | * | 9/1993 | Clark et al. |
| 5,496,778 A | | 3/1996 | Hoffman et al. ............ 437/250 |
| 5,722,442 A | | 3/1998 | Hoffman et al. ........... 134/102.1 |
| 5,738,699 A | * | 4/1998 | Hu et al. |
| 5,755,934 A | | 5/1998 | Hoffman et al. ............... 203/13 |
| 5,785,820 A | | 7/1998 | Hoffman et al. ............. 202/158 |
| 5,846,386 A | | 12/1998 | Hoffman et al. ............... 203/13 |
| 5,846,387 A | | 12/1998 | Hoffman et al. ............... 203/40 |
| RE36,290 E | * | 9/1999 | Clark et al. |
| 6,001,223 A | * | 12/1999 | Hoffman et al. |
| 6,015,477 A | * | 1/2000 | Hoffman et al. |

FOREIGN PATENT DOCUMENTS

| | | |
|---|---|---|
| EP | 0 870 729 A1 | 10/1998 |
| WO | WO 96/39265 | 12/1996 |

OTHER PUBLICATIONS

European Search Report, Application No. EP 01 40 2141.

* cited by examiner

*Primary Examiner*—Duane S. Smith
(74) *Attorney, Agent, or Firm*—Burns, Doane, Swecker & Mathis, L.L.P.

(57) ABSTRACT

Provided are ionic purifiers and methods that are suitable for providing an ultra-high-purity chemical to a semiconductor manufacturing process. The ionic purifiers include a vapor inlet introducing a chemical vapor to be purified into a column. A high-purity water inlet continuously introduces high-purity water into the column. The high-purity water contacts the chemical vapor to be purified, thereby forming a purified chemical vapor and contaminated water. A vapor outlet removes the purified chemical vapor from the column. A liquid outlet removes the contaminated water from the column. The invention has particular applicability in the semiconductor manufacturing industry.

31 Claims, 3 Drawing Sheets

IONIC PURIFIER

BACKGROUND OF THE INVENTION

1. Field of the Invention

The present invention relates to novel ionic purifiers and methods suitable for providing an ultra-high-purity chemical. The ionic purifiers and methods according to this invention have particular applicability to the semiconductor manufacturing industry.

2. Description of the Related Art

In the semiconductor manufacturing industry, a major concern at every stage in the manufacturing process is contamination. Control of contamination is critical to product quality, and an extremely high level of cleanliness and purity in the manufacturing environment is required to obtain acceptable product yield while maintaining profitability. Accordingly, a large fraction of the steps in modern integrated circuit (IC) manufacturing are dedicated to the cleaning of the semiconductor wafers being treated. Such cleanup steps are implemented to remove, for example, organic contaminants, metallic contaminants, photoresist (or inorganic residues thereof), byproducts of etching, native oxides, etc.

A significant source of wafer contamination is impurities in the process chemicals. Because cleanup steps are frequently performed in the manufacturing process and are necessary to maintain product quality, contamination due to cleanup chemistry is very undesirable. Certain chemicals present particular difficulties because they can contain both solid and volatile impurities which can be damaging to electronic components if present during the manufacturing process. Such chemicals can include, for example, ammonia, hydrogen chloride and hydrogen fluoride. The purity levels and compositions of the process chemicals can vary widely, depending on the source as well as the handling method. It is beneficial to reduce the amount of the impurities before the process chemicals are used in modern electronic component production lines.

The high cost and lack of flexibility of current methods for obtaining ultra-high-purity process chemicals contribute considerably to the overall cost of manufacture. Ultra-high-purity process chemicals are typically prepared using distillation processes. However, distillation processes can be impractical due to the cost and process control issues related to such processes.

As an alternative to distillation, process chemicals can be purchased from the limited sources which are able to supply them at an acceptable grade. However, ultra-high-purity process chemicals are generally expensive and typically can only be purchased from a limited number of qualified suppliers.

The use of ionic purifiers for on-site preparation of ultra-high-purity process chemicals has been described, for example, in U.S. Pat. Nos. 5,496,778; 5,722,442; 5,755,934; 5,785,820; 5,846,386; and 5,846,387, the entire contents of which patents are incorporated herein by reference.

FIG. 1 illustrates an ionic purifier 100 of the related art. The ionic purifier 100 includes a vapor inlet 104 which receives a chemical vapor to be purified and directs the vapor into a column 102. A vapor outlet 114 removes a purified chemical vapor from the column 102. A high-purity water inlet 106 introduces high-purity water into the column 102. A recirculation system 108, typically including a pump 110 and a recirculation stream 112, directs liquid that is collected at the lower portion of the column 102 to the upper portion of the column 102. As the chemical vapor to be purified ascends inside the column 102, the descending recirculated liquid countercurrently contacts the vapor, thereby hydrolyzing impurities present therein. The liquid collects at the lower portion of the column 102 and is recirculated to the upper portion of the column 102 for further removal of impurities. A heat exchanger 116 can be used to bring the recirculated liquid to a desired temperature. The ionic purifier 100 can also include a mist removal section 118.

While use of the ionic purifier 100 removes some impurities from the chemical vapor to be purified, it typically does not ensure the removal of species of impurities which have appreciable vapor pressures within the column 102. Most species of impurities are ionized in the aqueous phase and have a negligible vapor pressure above the liquid collected at the lower portion of the column 102, and thus typically do not enter into the vapor outlet 114. However, species with appreciable vapor pressures can be in equilibrium with the purified chemical vapor at the upper portion of the column 102 and can enter into the vapor outlet 114 with the product vapor.

The foregoing description of the related art demonstrates the need for provision of ultra-high-purity chemicals suitable for use in a semiconductor manufacturing process. To meet these requirements and to overcome the disadvantages of the related art, it is an object of the present invention to provide novel ionic purifiers suitable for providing an ultra-high-purity chemical to a semiconductor manufacturing process. It is a further object of the invention to provide novel methods suitable for providing an ultra-high-purity chemical to a semiconductor manufacturing process. The ionic purifiers and methods in accordance with the invention can advantageously be employed on-site at a semiconductor manufacturing facility.

Through the ionic purifiers and methods of the present invention, chemicals can be purified while minimizing or avoiding disadvantages associated with the related art resulting from recirculation of an impure liquid from the lower portion of the purifier to the upper portion thereof.

Other objects and aspects of the present invention will become apparent to one of ordinary skill in the art on a review of the specification, drawings and claims appended hereto.

SUMMARY OF THE INVENTION

The foregoing objectives are met by the ionic purifiers and methods of the present invention. According to a first aspect of the present invention, an ionic purifier is provided, suitable for providing an ultra-high-purity chemical to a semiconductor manufacturing process. The ionic purifier comprises:

(a) a vapor inlet for introducing a chemical vapor to be purified into a column;

(b) a high-purity water inlet for continuously introducing high-purity water into the column, wherein the high-purity water contacts the chemical vapor to be purified, thereby forming a purified chemical vapor and contaminated water;

(c) a vapor outlet for removing the purified chemical vapor from the column; and (d) a liquid outlet for removing the contaminated water from the column.

In accordance with a further aspect of the present invention, a method is provided, suitable for providing an ultra-high-purity chemical to a semiconductor manufacturing process. The method comprises the steps of:

(a) introducing a chemical vapor to be purified into a column;

(b) continuously introducing high-purity water into the column;

(c) contacting the chemical vapor to be purified with the high-purity water, thereby forming a purified chemical vapor and contaminated water;

(d) removing the purified chemical vapor from the column; and (e) removing the contaminated water from the column.

BRIEF DESCRIPTION OF THE DRAWINGS

Other objects and advantages of the invention will become apparent from the following detailed description of the preferred embodiments thereof in connection with the accompanying drawings, in which like features are designated by like reference numerals, and in which.

DETAILED DESCRIPTION OF THE PREFERRED EMBODIMENTS OF THE INVENTION

The purified chemical vapor and liquid chemical formed with the ionic purifiers and methods in accordance with the invention are typically of ultra-high-purity. As used herein, the term "ultra-high-purity" includes purity levels of less than about 100 ppt. Preferably, the purified chemical vapor provided by the present ionic purifiers can include less than about 10 ppt impurities.

Chemicals which can be purified using the ionic purifier include, but are not limited to, ammonia ($NH_3$), hydrogen chloride (HCl), hydrogen fluoride (HF), hydrogen bromide (HBr), hydrogen iodide (HI) and carbon dioxide ($CO_2$). For ultra-high-purity chemical production, the chemical vapor to be purified which is introduced into the ionic purifier preferably includes less than about 1 ppm impurities.

Figure 1:
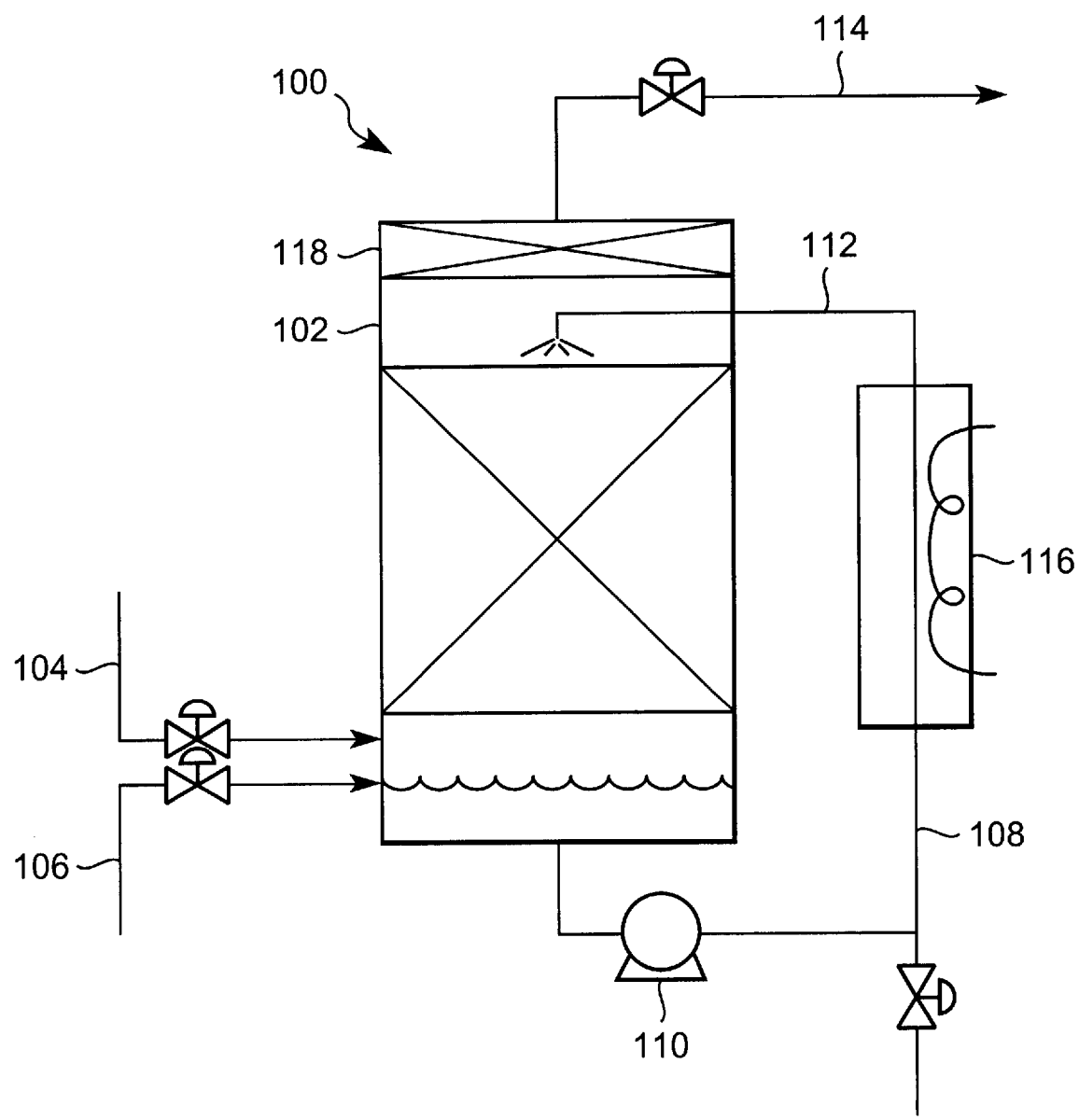
FIG. 1 illustrates an ionic purifier of the related art.
Figure 2:
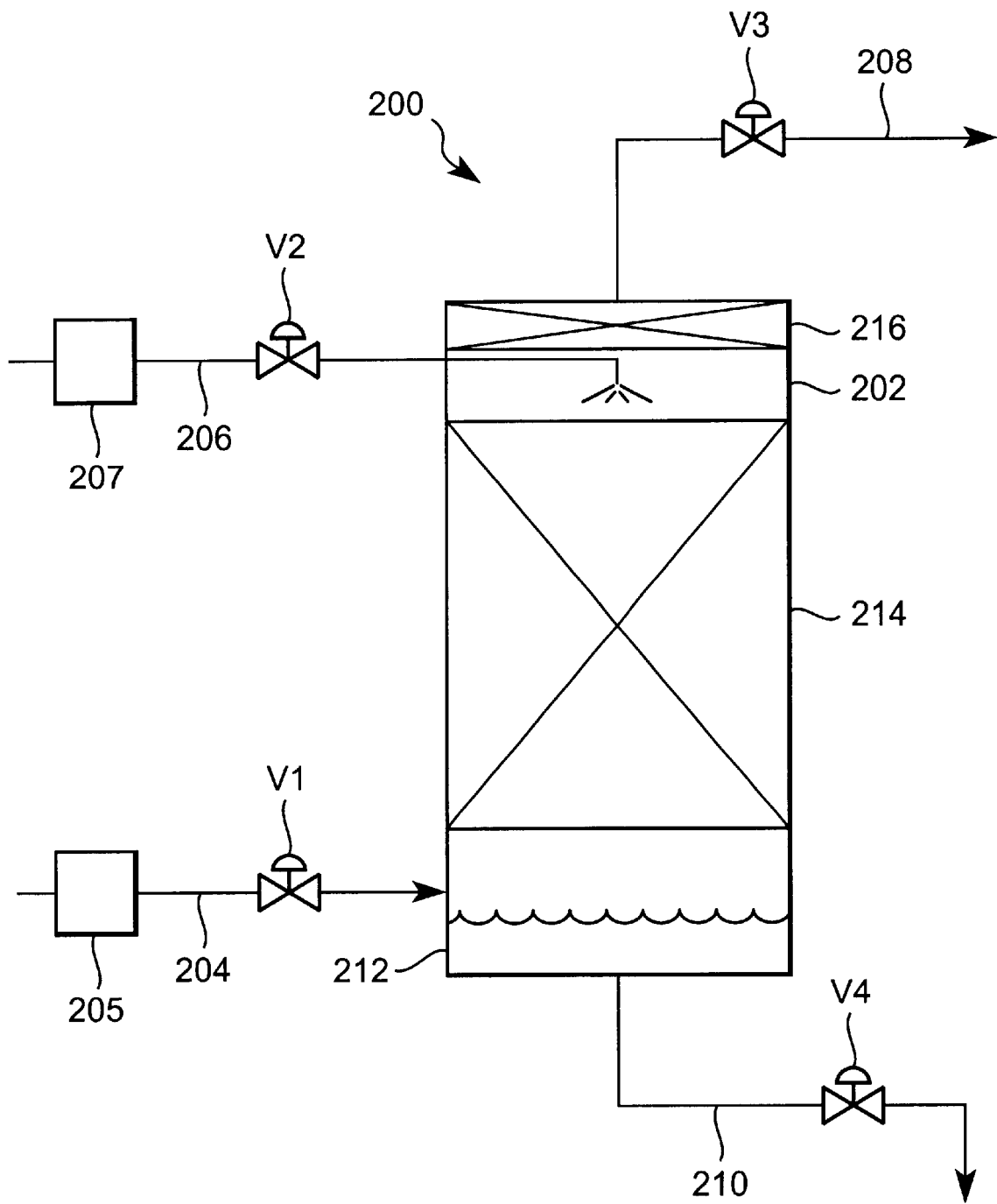
FIG. 2 illustrates an exemplary ionic purifier for providing a purified chemical, in accordance with the present invention.

The invention will now be described with reference to FIG. 2, which illustrates an ionic purifier 200 in accordance with an exemplary aspect of the present invention. The ionic purifier 200 includes a column 202 in which a chemical vapor is purified. A vapor inlet 204 introduces a chemical vapor to be purified, such as one of the chemicals set forth above, into the column 202, preferably continuously. A flow control device 205, such as a mass flow controller, and a valve V1 can be disposed upstream from the vapor inlet 204 to adjust the flow rate of the chemical vapor to be purified into the column 202. The flow rate is typically set according to the amount of product desired, the volume of the column 202 and/or others process variables.

The chemical vapor to be purified is preferably introduced into and distributed within the column 202 in a manner which maximizes liquid-vapor contact. For example, the chemical vapor to be purified is preferably uniformly distributed across the cross-section of the column 202. Various distributing devices can be used to maximize the uniform distribution of the chemical vapor to be purified. For example, the vapor inlet 204 can include a homogenizer (not shown). The column 202 preferably has a constant diameter to maximize the uniformity of the flow of the chemical vapor. The vapor inlet 204 preferably introduces the chemical vapor to be purified into the column 202 at a point below an optional packed section 214 disposed inside the column 202.

A high-purity water inlet 206 introduces high-purity water into the column 202, preferably continuously. Typically, the water that is used is deionized water. The high-purity water is typically produced at an on-site, centralized production unit which can also serve other processes requiring high-purity water. A flow control device 207 can be disposed upstream from the high-purity water inlet 206 to adjust the flow rate of the high-purity water into the column 202. The flow control device 207 can include, for example, a liquid mass flow controller, a metering pump in fixed flow mode or with a feedback controller, a flow meter and a servo control valve, and a fixed orifice. A valve V2 can also be disposed upstream from the high-purity water inlet 206.

The high-purity water is preferably introduced into and distributed within the column 202 in a manner which maximizes liquid-vapor contact. For example, the high-purity water is preferably uniformly distributed across the cross-section of the column 202. Various distributing devices can be used to ensure uniform distribution of the high-purity water. For example, a perforated pipe distributor, orifice-type distributor, trough-type distributor and/or a weir-riser distributor can be used. The column 202 preferably has a constant diameter to maximize the uniformity of the flow of the high-purity water. The high-purity water inlet 206 introduces high-purity water into the column 202, preferably at a point above the packed section 214.

The flow of high-purity water contacts the chemical vapor to be purified in the column 202, typically in a countercurrent manner. Impurities which are present in the chemical vapor to be purified and a portion of the chemical vapor itself typically are dissolved in the high-purity water. A purified chemical vapor and contaminated water which includes the impurities from the vapor are thus produced.

A suitable amount of high-purity water should be introduced into the column 202 to maximize the efficient operation of the ionic purifier 200. For example, introducing an insufficient amount of high-purity water can result in incomplete purification of the chemical vapor. On the other hand, introducing an excessive amount of high-purity water can cause a large amount of chemical vapor to dissolve into the high-purity water, thereby resulting in a low process yield. In a preferred embodiment of the present invention, the high-purity water can be introduced into the column 202 in an amount effective to saturate the vapor stream exiting the vapor outlet 208.

A vapor outlet 208 removes the purified chemical vapor from the column 202, while a liquid outlet 210 removes the contaminated water from the column 202. To minimize the contamination of the chemical vapor introduced into the column 202, the contaminated water removed from the column 202 is preferably not reintroduced into the column 202, and is typically sent to waste. With valves V3 and V4 in the normally open position, the purified vapor and contaminated water, respectively, can be removed from the column 202.

A vapor source provides the chemical vapor to be purified to the vapor inlet 204 of the ionic purifier 200. The vapor source can be connected to receive a chemical in liquid phase and to provide a flow of chemical vapor from the headspace. Drawing vapor in this manner from the vapor source typically serves as a single-stage distillation, leaving solid and high-boiling impurities behind in the liquid phase. For example, impurities that can be removed from the chemical vapor include metals of Groups I and II of the Periodic Table, and/or aminated and complexed forms of these metals formed by contact with the chemical. The single-stage distillation can also remove the following materials: oxides and carbonates of these metals; hydrides, such as beryllium hydride and magnesium hydride; Group III elements and oxides thereof, as well as ammonium adducts of hydrides and halides of these elements; transition metal hydrides; and/or heavy hydrocarbons and halocarbons such as pump oil.

Any conventional storage tank suitable for containing the specified chemical under desired process conditions can be used as the vapor source. The vapor source can be maintained at atmospheric pressure or above atmospheric pressure to enhance the flow of vapor from the vapor source. Another example of a vapor source which can be employed is a multi-stage distillation column.

The column 202 provides an enclosure in which the chemical vapor to be purified contacts the high-purity water. Any column suitable for containing the specified chemical vapor to be purified under desired process conditions can be used. A lower section 212 of the column 202 typically collects liquid descending the column 202.

A packed section 214 can be disposed inside the column 202 to increase liquid-vapor contact by providing additional surface area inside the column 202. The packed section 214 is preferably disposed above the vapor inlet 204 and below the high-purity water inlet 206. The packed section 214 comprises packing material such as, for example, Raschig and/or Pall rings. The packing material is made of a material which is suitable for use with the chemical to be purified. For example, packing material formed of TEFLON (a tetrafluoroethylene fluorocarbon polymer), polypropylene and/or quartz can be used for ammonia purification; TEFLON, PVDF and/or quartz can be used for hydrogen chloride purification; and TEFLON and/or PVDF can be used for hydrogen fluoride purification. Other materials known to those skilled in the art can also be employed. Plastic materials are preferred because they typically can be shaped into packing material having an efficient design.

The column 202 can optionally include a mist removal section 216 disposed above the packed section 214. The mist removal section 216 preferably includes packing material that can be the same material used in the packed section 214 of the column 202. According to this exemplary embodiment, the purified chemical vapor passes through the mist removal section 216 prior to exiting the column 202 via the vapor outlet 208. The mist removal section 216 collects liquid droplets entrained in the chemical vapor and reduces the amount of liquid which exits the vapor outlet 208. Liquid that is collected in the mist removal section 216 can be directed to the lower section 212 of the column 202 and/or purged from the column 202.

The vapor outlet 208 removes the purified chemical vapor from the column 202, preferably at a point in the column 202 above the packed section 214 and the high-purity water inlet 206, more preferably from the top of the column 202. The purified chemical vapor is preferably removed continuously from the column 202, and the removed vapor can be divided into two or more streams. The purified vapor streams can then be sent to one or more use stations such as, for example, to one or more chemical vapor deposition (CVD) or etching systems. Additionally or alternatively, one or more of the vapor streams can be used to form liquid chemicals for use in wet treatment stations.

The liquid outlet 210 removes the contaminated water from the column 202, preferably from the bottom of the column 202. The contaminated water typically contains dissolved impurities and dissolved chemical from the chemical vapor to be purified. The contaminated water typically collects at the lower section 212 of the column 202 before subsequently being removed. In an alternative embodiment, the contaminated water is immediately removed from the column 202. The contaminated water is preferably not reintroduced into the column 202. In this embodiment, the absence of contaminated water recirculating from the lower section 212 of the column 202 to the upper section of the column 202 conspicuously ameliorates or prevents the introduction of impurities into the upper section of the column 202. The liquid outlet 210 preferably removes the contaminated water continuously, but can remove the flow on a batch basis in an alternative embodiment. As discussed above, the liquid collected in the optional mist removal section 216 can be removed from the column 202 via the liquid outlet 210.

The flow rate of the chemical to be purified and the high-purity water will depend on various process variables including, for example, the dimensions of the vapor inlet 204, high-purity water inlet 206 and column 202. The operating temperature and pressure of the column 202 can also affect the flow rates.

The ionic purifier 200 can be used in conjunction with additional units to provide chemicals suitable for use in various processes. For example, a distillation column can be connected to receive the purified chemical vapor from the ionic purifier 200 for further purification. If a gaseous product is desired, a drying unit can be connected to receive and dry the purified chemical vapor. Alternatively, if a liquid product is desired, a generator unit can be connected to receive the purified chemical vapor. The generator unit typically combines the chemical vapor with a liquid to produce an aqueous solution comprising the purified chemical. For on-site use of the purified chemical, piping connections can be used to route the gaseous or liquid purified chemical to at least one point of use in the semiconductor device fabrication facility.

In addition, prior to being fed into the ionic purifier 200, the chemical vapor to be purified can optionally be passed through a particulate filtration unit to remove any solid matter entrained with the vapor. Microfiltration and ultrafiltration units and membranes are commercially available and can be used. The size of the filter can typically be selected according to the size and type of particulate matter to be removed from the vapor.

Figure 3:
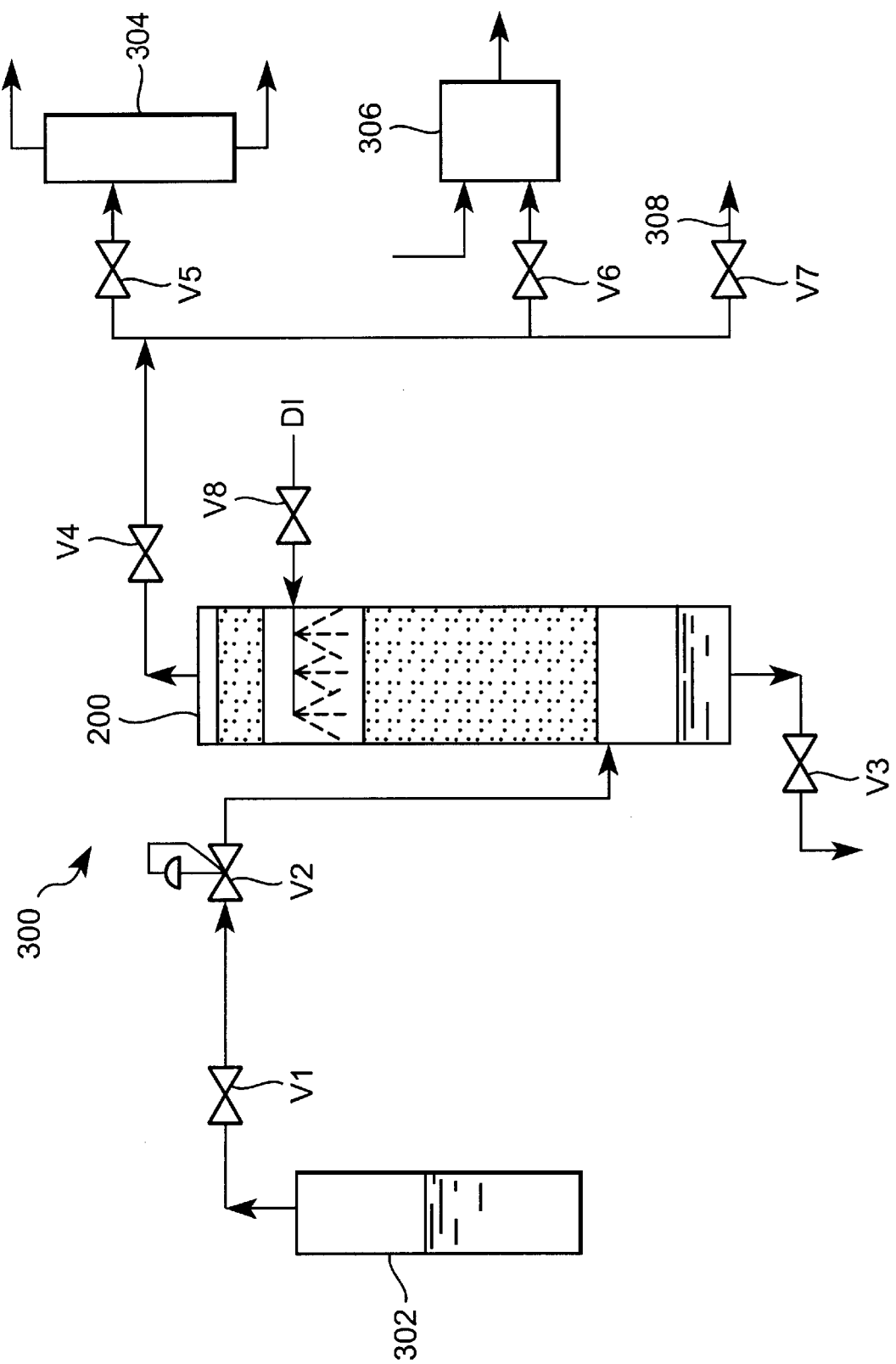
FIG. 3 illustrates an exemplary apparatus for providing a purified chemical, in accordance with the present invention.

FIG. 3 illustrates an exemplary apparatus 300 for providing a purified chemical. This apparatus 300 includes a storage tank 302 or other container which contains a liquid chemical to be purified. Vapor is drawn from the storage tank 302 and is introduced into the ionic purifier 200. The purified vapor exiting the purifier 200 can be directed to: (1) a distillation column 304 where the purified vapor is further purified; (2) a generator 306 where the purified vapor is combined with deionized water to form an aqueous solution; and/or (3) a transfer line 308 which carries the purified vapor to a point of use. Valves V1, V2, V3, V4, V5, V6, V7 and V8 can control the flows within the apparatus 300.

The high-purity water used in the ionic purifier 200 is preferably deionized water. The water can be purified in accordance with semiconductor manufacturing standards which are well known among those skilled in the art. Methods of purifying water in accordance with these standards typically include, for example, ion exchange and reverse osmosis. Ion exchange methods typically include: chemical treatment such as chlorination to kill organisms; sand filtration for particle removal; activated charcoal filtration to remove chlorine and traces of organic matter; diatomaceous earth filtration; anion exchange to remove strongly ionized acids; mixed bed purification containing both cation and anion exchange resins to remove further ions; sterilization, involving chlorination or ultraviolet light; and filtration through a filter of 0.45 micron or less.

Reverse osmosis methods typically include, for example, the passage of the water under pressure through a selectively permeable membrane which is impermeable to many of the dissolved or suspended substances. Typical standards for the purity of the water resulting from these processes are a resistivity of at least about 15 megaohm-cm at 25° C. (typically about 18 megaohm-cm at 25° C.); less than about 25 ppb of electrolytes; a particulate content of less than about $150/cm^3$ and a particle size of less than 0.2 micron; a microorganism content of less than about $10/cm^3$; and/or a total organic carbon content of less than 100 ppb.

The ionic purifier 200 preferably operates under adiabatic conditions. For adiabatic operation, the heat evolved by hydrolysis of the chemical vapor is typically approximately equivalent to the heat of vaporization of the amount of water sufficient to saturate the product stream, plus any additional heat sufficient to raise the temperature of the product stream to specified levels.

The ionic purifier 200 also preferably operates under isothermal conditions. The chemical vapor to be purified and the high-purity water can be heated or cooled. Supplying or removing heat from incoming and/or outgoing flows can be accomplished through use of a heat exchanger such as, for example, internal and/or jacket heat exchangers.

In the ionic purifiers and methods of the present invention, a high degree of control over the product concentration and hence the flow rates can be achieved by precise monitoring and metering using equipment and instrumentation. A convenient means of achieving this is by using acoustic velocity sensing. Other methods will be readily apparent to those skilled in the art.

EXAMPLES

Example 1

$NH_3$ Purification

The ionic purifier is operated under adiabatic and isothermal conditions at 25° C. The purified $NH_3$ output mass flow rate is 60 g/min at 2 atm partial pressure. Water injected into the column is immediately evaporated to saturate the output stream. The partial pressure of water above a 35% aqueous solution at 25° C. is approximately 0.04 atm, representing 2% of the total pressure. Thus an output stream containing 60 g/min of $NH_3$ also contains 1.2 g/min of $H_2O$ for a total output of 61.2 g/min.

The total heat gained by the ionic purifier is the heat evolved by the hydrolysis of $NH_3$ into the aqueous phase. The total heat lost by the ionic purifier is the heat of vaporization of an amount of water necessary to saturate the output stream. The input and output streams are at 25° C. The heat evolved from the $NH_3$ dissolving into the high-purity water is equal to the heat taken to vaporize the water into the output stream. The heat of vaporization of water at 25° C. is 2400 J/g. Thus the heat required to vaporize 1.2 g of water is 2880 J. The heat evolved by dissolving 1 g of $NH_3$ into a 35% solution is approximately 1900 mJ/g. Therefore, 1.5 g of $NH_3$ is dissolved to produce the required 2880 J, which is transported to the bottom of the column and purged. Thus the process yield in this example is 98%. The purity level of the product outlet stream typically is less than about 100 ppt, preferably less than about 10 ppt impurities. Table 1 presents the compositions, temperatures and phases of each input and output stream of the ionic purifier.

TABLE 1

|  | $NH_3$ input stream | DI input stream | Purge outlet stream | Product outlet stream |
|---|---|---|---|---|
| Mass Flow Rate of $NH_3$, g/min | 61.50 | 0 | 1.50 | 60.00 |
| Mass Flow Rate of $H_2O$, g/min | 0 | 3.96 | 2.76 | 1.20 |
| Total Mass Flow Rate, g/min | 61.50 | 3.96 | 4.26 | 61.20 |
| Assay, Wt. % $NH_3$ | 100.00 | 0 | 35.21 | 98.04 |
| Temperature, ° C. | 25 | 25 | 25 | 25 |
| Phase | Vapor | Liquid | Liquid | Vapor |

Additional heat loss from the ionic purifier to the atmosphere has not been included in any of the examples. However, the heat loss to the atmosphere can be determined empirically, and adjustments to the flow rates can be made accordingly.

Example 2

HF Purification

The ionic purifier is operated under adiabatic conditions. The purified HF output flow is 1 g/s at 2 atm partial pressure with an outlet temperature of 80° C. Water injected into the column is immediately evaporated to saturate the output stream. The partial pressure of water above a 63% aqueous solution at 353 K is approximately 2% by wt. Thus an output stream containing 1 g/s of HF also contains 0.02 g/s of $H_2O$ for a total output of 1.02 g/s.

The amounts of heat gained and lost by the ionic purifier should be balanced for the ionic purifier to operate under adiabatic conditions. The heat gained by the ionic purifier is the heat evolved by the hydrolysis of HF into the aqueous phase. The heat lost by the ionic purifier is the heat of vaporization of an amount of water necessary to saturate the output stream, and the heat required to raise the temperature of the output gaseous streams (HF and $H_2O$) and the outlet liquid stream (aqueous HF) to 80° C. The purity level of the product outlet stream typically is less than about 100 ppt, preferably less than about 10 ppt impurities. Table 2 presents the compositions, temperatures and phases of each input and output stream of the ionic purifier.

TABLE 2

|  | HF input stream | DI input stream | Purge outlet stream | Product outlet stream |
|---|---|---|---|---|
| Mass Flow Rate of HF, g/min | 64.02 | 0 | 4.02 | 60.00 |
| Mass Flow Rate of $H_2O$, g/min | 0 | 2.94 | 1.74 | 1.20 |

TABLE 2-continued

|  | HF input stream | DI input stream | Purge outlet stream | Product outlet stream |
|---|---|---|---|---|
| Total Mass Flow Rate, g/min | 64.02 | 2.94 | 5.76 | 61.20 |
| Assay, Wt. % HF | 100.00 | 0 | 69.79 | 98.04 |
| Temperature, ° C. | 25 | 25 | 80 | 80 |
| Phase | Vapor | Liquid | Liquid | Vapor |

The heat gained is equal to the heat lost in adiabatic processes. In this example, the heat evolved by the dissolution of HF into the aqueous phase is equal to the heat required to vaporize water into the output stream, plus the heat necessary to raise the temperature of the purified water, HF vapor, and the outlet liquid to the specified temperatures.

Example 3

HCl Purification (30° C. outlet temperature)

The ionic purifier according to the present invention is operated under adiabatic conditions to purify an HCl vapor input stream. The purity level of the product outlet stream typically is less than about 100 ppt, preferably less than about 10 ppt impurities. Table 3 presents the compositions, temperatures and phases of each input and output stream of the ionic purifier.

TABLE 3

|  | HCl input stream | DI input stream | Purge outlet stream | Product outlet stream |
|---|---|---|---|---|
| Mass Flow Rate of HCl, g/min | 91.39 | 0 | 7.48 | 83.91 |
| Mass Flow Rate of H$_2$O, g/min | 0 | 11.52 | 11.22 | 0.3 |
| Total Mass Flow Rate, g/min | 91.39 | 11.52 | 18.69 | 84.22 |
| Assay, Wt. % HCl | 100.00 | 0 | 40.00 | 99.64 |
| Temperature, ° C. | 20 | 20 | 30 | 30 |
| Phase | Vapor | Liquid | Liquid | Vapor |

Example 4

HCl Purification (65° C. outlet temperature)

The ionic purifier according to the present invention is operated under adiabatic conditions to purify an HCl vapor input stream. The purity level of the product outlet stream typically is less than about 100 ppt, preferably less than about 10 ppt impurities. Table 4 presents the compositions, temperatures, and phases of each input and output stream of the ionic purifier.

TABLE 4

|  | HCl input stream | DI input stream | Purge outlet stream | Product outlet stream |
|---|---|---|---|---|
| Mass Flow Rate of HCl, g/min | 91.39 | 0 | 7.48 | 83.91 |
| Mass Flow Rate of H$_2$O, g/min | 0 | 18.07 | 14.84 | 3.23 |
| Total Mass Flow Rate, g/min | 91.39 | 18.07 | 22.32 | 87.14 |
| Assay, Wt. % HCl | 100.00 | 0 | 33.50 | 96.30 |
| Temperature, ° C. | 20 | 20 | 65 | 65 |
| Phase | Vapor | Liquid | Liquid | Vapor |

As will be recognized by those skilled in the art, the aspects of the present invention can be modified and varied over a range of applications. For example, the aspects of the present invention are not strictly limited to manufacture of integrated circuits, but can also be applied to manufacturing discrete semiconductor components, such as optoelectronic and power devices. In addition, the aspects of the present invention can also be used in other technologies where integrated circuit manufacturing methods have been adopted, such as in thin-film magnetic heads and active-matrix liquid-crystal displays.

The present ionic purifiers and methods can be used for the on-site production of ultra-high-purity chemicals. Alternatively, the ionic purifiers can be adapted to operate as part of a manufacturing unit to produce ultra-high-purity chemicals for shipment. However, shipping the ultra-high-purity chemicals typically does not provide some of the advantages of on-site purification. Such applications can encounter the inherent risks of handling ultra-high-purity chemicals, as discussed above. If packaged chemicals are required, the present invention can at least provides a way to achieve a high initial purity.

While the invention has been described in detail with reference to specific embodiments thereof, it will be apparent to one skilled in the art that various changes and modifications can be made, and equivalents employed, without departing from the scope of the claims.

What is claimed is:

1. An ionic purifier suitable for providing an ultra-high-purity chemical to a semiconductor manufacturing process, comprising:

(a) a vapor inlet for introducing a chemical vapor to be purified into a column;

(b) a high-purity water inlet for continuously introducing high-purity water into the column, wherein the high-purity water contacts the chemical vapor to be purified, thereby forming a purified chemical vapor and contaminated water;

(c) a vapor outlet for removing the purified chemical vapor from the column; and (d) a liquid outlet for removing the contaminated water from the column.

2. The ionic purifier according to claim 1, wherein packing material is disposed inside the column.

3. The ionic purifier according to claim 2, wherein the vapor inlet introduces the chemical vapor to be purified into the column at a point below the packing material.

4. The ionic purifier according to claim 2, wherein the high-purity water inlet continuously introduces the high-purity water into the column at a point above the packing material.

5. The ionic purifier according to claim 1, wherein the vapor inlet continuously introduces the chemical vapor to be purified into the column.

6. The ionic purifier according to claim 1, wherein a vapor stream comprising the purified chemical vapor is removed from the column via the vapor outlet, and wherein the high-purity water is continuously introduced in an amount effective to saturate the vapor stream.

7. The ionic purifier according to claim 1, wherein the liquid outlet continuously removes the contaminated water from the column.

8. The ionic purifier according to claim 1, wherein the chemical vapor to be purified comprises a chemical selected from the group consisting of ammonia, hydrogen chloride, hydrogen fluoride, hydrogen bromide, hydrogen iodide and carbon dioxide.

9. The ionic purifier according to claim 1, wherein the ionic purifier is operated adiabatically.

10. The ionic purifier according to claim 1, wherein the ionic purifier is operated isothermally.

11. The ionic purifier according to claim 1, wherein the chemical to be purified is heated or cooled.

12. The ionic purifier according to claim 1, wherein the high-purity water is heated or cooled.

13. The ionic purifier according to claim 1, wherein the contaminated water removed from the column is not reintroduced into the column.

14. The ionic purifier according to claim 1, wherein a storage tank provides the chemical vapor to be purified to the vapor inlet.

15. The ionic purifier according to claim 14, wherein the storage tank contains an aqueous solution comprising the chemical of the chemical vapor to be purified, and wherein the chemical vapor to be purified is drawn from the headspace of the storage tank.

16. The ionic purifier according to claim 1, wherein a generator unit receives the purified chemical vapor and combines the purified chemical vapor with a liquid to produce an ultra-high-purity chemical solution.

17. The ionic purifier according to claim 1, wherein a filter removes particulate matter from the chemical vapor to be purified.

18. The ionic purifier according to claim 1, wherein a distillation column receives the purified chemical vapor.

19. A method suitable for providing an ultra-high-purity chemical to a semiconductor manufacturing process, comprising the steps of:

(a) introducing a chemical vapor to be purified into a column;

(b) continuously introducing high-purity water into the column;

(c) contacting the chemical vapor to be purified with the high-purity water, thereby forming a purified chemical vapor and contaminated water;

(d) removing the purified chemical vapor from the column; and (e) removing the contaminated water from the column.

20. The method according to claim 19, wherein packing material is disposed inside the column.

21. The method according to claim 20, wherein the chemical vapor to be purified is introduced into the column at a point below the packing material.

22. The method according to claim 20, wherein the high-purity water is continuously introduced into the column at a point above the packing material.

23. The method according to claim 19, wherein the chemical vapor to be purified is continuously introduced into the column.

24. The method according to claim 19, wherein a vapor stream comprising the purified chemical vapor is removed from the column, and wherein the high-purity water is continuously introduced in an amount effective to saturate the vapor stream.

25. The method according to claim 19, wherein the contaminated water is continuously removed from the column.

26. The method according to claim 19, wherein the chemical vapor to be purified comprises a chemical selected from the group consisting of ammonia, hydrogen chloride, hydrogen fluoride, hydrogen bromide, hydrogen iodide and carbon dioxide.

27. The method according to claim 19, wherein the ionic purifier is operated adiabatically.

28. The method according to claim 19, wherein the ionic purifier is operated isothermally.

29. The method according to claim 19, wherein the chemical to be purified is heated or cooled.

30. The method according to claim 19, wherein the high-purity water is heated or cooled.

31. The method according to claim 19, wherein the contaminated water removed from the column is not reintroduced into the column.

* * * * *